(12) United States Patent
Wang et al.

(10) Patent No.: US 12,292,647 B2
(45) Date of Patent: May 6, 2025

(54) DISPLAYING MODULE AND METHOD FOR MANUFACTURING THE SAME, AND DISPLAYING DEVICE

(71) Applicants: Hefei BOE Display Technology Co., Ltd., Anhui (CN); BOE Technology Group Co., Ltd., Beijing (CN)

(72) Inventors: Chaoyue Wang, Beijing (CN); Jianming Liu, Beijing (CN); Xunwang Yu, Beijing (CN); Wenbo Dong, Beijing (CN); Wei Kang, Beijing (CN); Huiming Wang, Beijing (CN); Xinyue He, Beijing (CN); Peng Zhao, Beijing (CN)

(73) Assignees: Hefei BOE Display Technology Co., Ltd., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/027,509

(22) PCT Filed: Mar. 23, 2022

(86) PCT No.: PCT/CN2022/082572
§ 371 (c)(1),
(2) Date: Mar. 21, 2023

(87) PCT Pub. No.: WO2023/178561
PCT Pub. Date: Sep. 28, 2023

(65) Prior Publication Data
US 2024/0295771 A1 Sep. 5, 2024

(51) Int. Cl.
*G02F 1/13357* (2006.01)

(52) U.S. Cl.
CPC .... *G02F 1/133606* (2013.01); *G02F 2202/28* (2013.01)

(58) Field of Classification Search
CPC ........... G02F 1/133606; G02F 2202/28; G02F 1/133308; G02F 1/133331; G02F 1/1335;
(Continued)

(56) References Cited

U.S. PATENT DOCUMENTS 9,001,424 B2 * 4/2015 Sun .......................... G02B 1/04
359/613
10,890,697 B2 * 1/2021 Park ..................... G02B 5/0247
(Continued)

FOREIGN PATENT DOCUMENTS

| CN | 201087849 Y | 7/2008 |
|---|---|---|
| CN | 101285961 A | 10/2008 |

(Continued)

*Primary Examiner* — Kevin Quarterman
(74) *Attorney, Agent, or Firm* — WHDA, LLP

(57) ABSTRACT

A displaying module and a method for manufacturing the same, and a displaying, device, which relates to the technical field of displaying. The displaying module includes a liquid-crystal display panel, an adhering layer and an optical film that are arranged in layer configuration; the adhering layer is disposed between a shadow surface of the liquid-crystal display panel and the optical film, and is configured for adhesively bonding the liquid-crystal display panel and the optical film; and an orthographic projection of the adhering layer on the liquid-crystal display panel covers at least an active area of the liquid-crystal display panel, and an orthographic projection of the optical film on the liquid-crystal display panel covers at least the active area of the liquid-crystal display panel.

16 Claims, 7 Drawing Sheets

(58) Field of Classification Search
CPC ......... G02F 1/133504; G02F 1/133512; G02F 1/1336; G02B 5/02; G02B 5/04
See application file for complete search history.

(56) References Cited

U.S. PATENT DOCUMENTS

| | | | |
|---|---|---|---|
| 11,487,149 B2* | 11/2022 | Noma | ............... G02F 1/133565 |
| 2008/0117507 A1 | 5/2008 | Olczak et al. | |
| 2014/0133133 A1 | 5/2014 | Tyan et al. | |
| 2014/0340911 A1* | 11/2014 | Woo | ..................... G02B 5/0231 362/311.03 |
| 2017/0153363 A1 | 6/2017 | Lee et al. | |
| 2017/0315402 A1* | 11/2017 | Kashiwagi | ............... G02B 5/00 |
| 2018/0307092 A1 | 10/2018 | Lin et al. | |
| 2023/0400731 A1 | 12/2023 | Cong et al. | |

FOREIGN PATENT DOCUMENTS

| | | |
|---|---|---|
| CN | 101452086 A | 6/2009 |
| CN | 202362474 U | 8/2012 |
| CN | 203240403 U | 10/2013 |
| CN | 203573061 U | 4/2014 |
| CN | 103809230 A | 5/2014 |
| CN | 104678644 A | 6/2015 |
| CN | 104678648 A | 6/2015 |
| CN | 205507127 U | 8/2016 |
| CN | 106814504 A | 6/2017 |
| CN | 107238976 A | 10/2017 |
| CN | 108254965 A | 7/2018 |
| CN | 207867176 U | 9/2018 |
| CN | 108732811 A | 11/2018 |
| CN | 109575764 A | 4/2019 |
| CN | 109633800 A | 4/2019 |
| CN | 208999590 U | 6/2019 |
| CN | 109975918 A | 7/2019 |
| CN | 110928053 A | 3/2020 |
| CN | 113296312 A | 8/2021 |
| CN | 113589414 A | 11/2021 |
| CN | 215117080 U | 12/2021 |
| CN | 215297867 U | 12/2021 |
| CN | 114114505 A | 3/2022 |
| CN | 114137760 A | 3/2022 |
| JP | 2002-243920 A | 8/2002 |
| JP | 2004-151550 A | 5/2004 |
| KR | 20190040629 A | 4/2019 |
| KR | 20190062889 A | 6/2019 |
| TW | M317021 U | 8/2007 |
| WO | 03032074 A1 | 4/2003 |
| WO | 2021/185270 A1 | 9/2021 |

* cited by examiner

DISPLAYING MODULE AND METHOD FOR MANUFACTURING THE SAME, AND DISPLAYING DEVICE

TECHNICAL FIELD

The present disclosure relates to the technical field of displaying and, more particularly, to a displaying module and a method for manufacturing the same, and a displaying device.

BACKGROUND

With the development of the technique of displaying, extremely-narrow-border-frame screens have become popular. Because the black matrix disposed at the edge of the extremely-narrow-border-frame screens has a very low width, the traditional middle frame might shield the displayed frame, and has become incapable of satisfying the requirement by the assembling of an extremely-narrow-border-frame module. Moreover, a simple extremely narrow middle frame has problems such as a high difficulty in the fabricating process, an insufficient mechanical strength, an excessively small contact area with the optical film that cannot press the optical film, and difficulty in the assembling.

SUMMARY

The present disclosure provides a displaying module, wherein the displaying module includes a liquid-crystal display panel, an adhering layer and an optical film that are arranged in layer configuration;
  wherein the adhering layer is disposed between a shadow surface of the liquid-crystal display panel and the optical film, and is configured for adhesively bonding the liquid-crystal display panel and the optical film; and
  an orthographic projection of the adhering layer on the liquid-crystal display panel covers at least an active area of the liquid-crystal display panel, and an orthographic projection of the optical film on the liquid-crystal display panel covers at least the active area of the liquid-crystal display panel.

In an alternative implementation, an edge of the liquid-crystal display panel, an edge of the adhering layer and an edge of the optical film are flush with each other.

In an alternative implementation, the adhering layer is an atomized adhering layer, and the atomized adhering layer includes an adhesive layer and diffusing particles dispersed in the adhesive layer.

In an alternative implementation, the adhering layer is an atomized adhering layer; and
  a haze value of the atomized adhering layer is larger than or equal to 60%, or a haze value of the atomized adhering layer is larger than or equal to 95%.

In an alternative implementation, the optical film includes a first light diffusing layer, and the first light diffusing layer is distal to the liquid-crystal display panel, and a haze value of the first light diffusing layer is larger than or equal to 75%.

In an alternative implementation, the optical film further includes a second light diffusing layer, and the second light diffusing layer is adjacent to the liquid-crystal display panel;
  the first light diffusing layer includes a first matrix layer and a first atomizing-particle layer that are arranged in layer configuration, and the first atomizing-particle layer is disposed at one side of the first matrix layer distal to the liquid-crystal display panel; and the second light diffusing layer includes a second matrix layer and a second atomizing-particle layer that are arranged in layer configuration, and the second atomizing-particle layer is disposed at one side of the second matrix layer that is adjacent to the liquid-crystal display panel; and
  a primary material of the first matrix layer and a primary material of the second matrix layer are a polymer resin.

In an alternative implementation, the optical film includes a first prism layer and a second prism layer, the first prism layer includes a plurality of first prism columns parallel to each other, the second prism layer includes a plurality of second prism columns parallel to each other, and an extending direction of the first prism columns and an extending direction of the second prism columns are perpendicular to each other.

In an alternative implementation, the optical film includes at least one of the following film layers: a first light diffusing layer, a first prism layer, a second prism layer, a brightness enhancing film and a second light diffusing layer that are arranged in layer configuration, and the first light diffusing layer is furthest from the liquid-crystal display panel.

In an alternative implementation, at least one of the film layers included by the optical film forms a composite film together with the adhering layer; and/or
  at least two of the film layers included by the optical film form a composite film.

In an alternative implementation, the optical film, the adhering layer and the liquid-crystal display panel form a fully adhered structure, and the displaying module further includes:
  a light shielding layer, disposed on a lateral side surface of the fully adhered structure, configured for blocking light rays at the lateral side surface.

In an alternative implementation, a material of the light shielding layer includes at least one of a black adhesive, a black printing ink and a light shielding adhesive tape.

In an alternative implementation, the displaying module further includes:
  a supporting platform, located at a light-coming side of the fully adhered structure, configured for supporting the fully adhered structure, wherein a surface of the supporting platform that is adjacent to the fully adhered structure is a supporting surface, and an orthographic projection of the supporting surface on the liquid-crystal display panel does not intersect or overlap with the active area; and
  an adhesively bonding layer, disposed between the supporting surface and the fully adhered structure, configured for adhesively bonding the fully adhered structure to the supporting platform.

In an alternative implementation, the displaying module further includes:
  an extending part, disposed on the supporting surface, wherein the extending part extends to the lateral side surface of the fully adhered structure in a first direction, wherein the first direction refers to a direction pointing from the optical film to the liquid-crystal display panel; and
  the extending part is located at one side of the light shielding layer distal to the fully adhered structure, and the extending part and the light shielding layer are adhesively bonded to each other or independent of each other.

In an alternative implementation, a material of the adhesively bonding layer includes a black adhesive, a light shielding adhesive tape, a transparent adhesive or a transparent adhesive tape.

The present disclosure provides a displaying device, wherein the displaying device includes the displaying module according to any one of the above embodiments.

The present disclosure provides a manufacturing method of a displaying module, wherein the displaying module includes a liquid-crystal display panel, an adhering layer and an optical film that are arranged in layer configuration, and the manufacturing method includes:

providing the liquid-crystal display panel, the adhering layer and the optical film; and adhering the adhering layer and the optical film to a shadow surface of the liquid-crystal display panel, to obtain a fully adhered structure, wherein the adhering layer is adjacent to the liquid-crystal display panel, and is configured for adhesively bonding the liquid-crystal display panel and the optical film; and an orthographic projection of the adhering layer on the liquid-crystal display panel covers at least an active area of the liquid-crystal display panel, and an orthographic projection of the optical film on the liquid-crystal display panel covers at least the active area of the liquid-crystal display panel.

In an alternative implementation, the adhering layer and the optical film form a composite film, and the composite film further includes a release liner disposed at one side of the adhering layer distal to the optical film; and the step of adhering the adhering layer and the optical film to the shadow surface of the liquid-crystal display panel includes:

stripping the release liner of the composite film; and adhering the adhering layer in the composite film where the stripping of the release liner is completed to the shadow surface of the liquid-crystal display panel, to synchronously complete adhesion between the adhering layer and the liquid-crystal display panel and adhesion between the optical film and the liquid-crystal display panel.

In an alternative implementation, the optical film includes a first optical film, the first optical film is a monolayer film or a composite film, the adhering layer is a monolayer film, and the monolayer film of the adhering layer further includes a light release liner disposed at a first side of the adhering layer and a heavy release liner disposed at a second side of the adhering layer; and the step of adhering the adhering layer and the optical film to the shadow surface of the liquid-crystal display panel includes:

stripping the light release liner;

adhering the first side of the adhering layer to the shadow surface of the liquid-crystal display panel;

stripping the heavy release liner; and adhering a light-exiting surface of the first optical film to the second side of the adhering layer.

In an alternative implementation, the optical film includes a second optical film, and the second optical film is a monolayer film or a composite film; and the step of adhering the adhering layer and the optical film to the shadow surface of the liquid-crystal display panel includes:

uniformly coating a haze water glue on a light-exiting surface of the second optical film, wherein the haze water glue includes a glue and diffusing particles dispersed in the glue;

adhering one side of the second optical film that is coated by the haze water glue to the shadow surface of the liquid-crystal display panel; and solidifying the haze water glue, wherein the solidified haze water glue forms the adhering layer.

In an alternative implementation, after the step of obtaining the fully adhered structure, the method further includes:

providing a border frame, wherein the border frame includes an extending part;

assembling the border frame and the fully adhered structure, whereby the extending part is located on a lateral side surface of the fully adhered structure; and forming a light shielding layer between the extending part and the fully adhered structure, wherein the light shielding layer is configured for blocking light rays between the extending part and the fully adhered structure.

In an alternative implementation, after the step of obtaining the fully adhered structure, the method further includes:

forming a light shielding layer on a lateral side surface of the fully adhered structure, wherein the light shielding layer is configured for blocking light rays at the lateral side surface;

providing a border frame, wherein the border frame includes an extending part; and assembling the border frame and the fully adhered structure, whereby the extending part is located at one side of the light shielding layer distal to the fully adhered structure.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
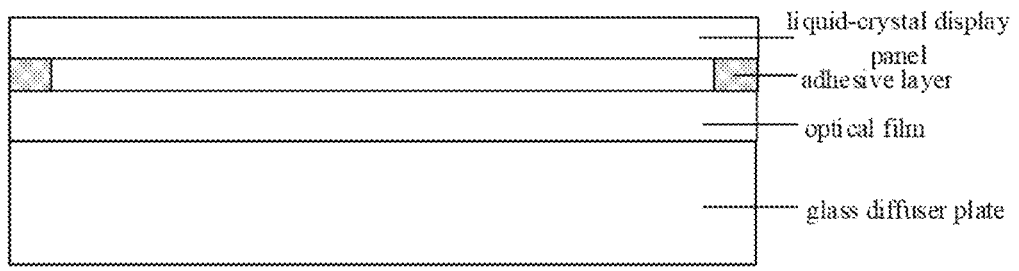
FIG. 1 schematically shows a schematic sectional structural diagram of a displaying module in the related art.

In the related art, as shown in FIG. 1, an optical film and a liquid-crystal display panel are usually adhesively bonded by using adhesive layers disposed at the edges. The optical film usually employs a glass diffuser plate as the bearing plate, and the usage of the glass diffuser plate causes that a middle frame must be disposed in the border frame to support the glass diffuser plate. However, the middle frame of the extremely-narrow-border-frame screens has a high difficulty in design.

Figure 2:
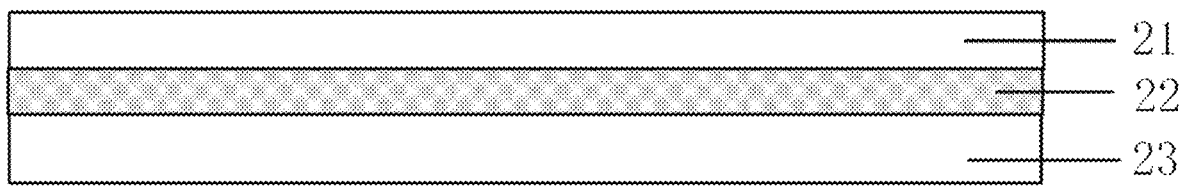
FIG. 2 schematically shows a schematic sectional structural diagram of a displaying module according to the present disclosure.

In order to solve the above problem, the present disclosure provides a displaying module. Referring to FIG. 2, FIG. 2 schematically shows a schematic sectional structural diagram of a displaying module according to the present disclosure. As shown in FIG. 2, the displaying module includes a liquid-crystal display panel 21, an adhering layer 22 and an optical film 23 that are arranged in layer configuration.

The adhering layer 22 is disposed between the shadow surface of the liquid-crystal display panel 21 and the optical film 23, and is configured for adhesively bonding the liquid-crystal display panel 21 and the optical film 23.

The orthographic projection of the adhering layer 22 on the liquid-crystal display panel 21 covers at least the active area of the liquid-crystal display panel 21, and the orthographic projection of the optical film 23 on the liquid-crystal display panel 21 covers at least the active area of the liquid-crystal display panel 21.

The shadow surface of the liquid-crystal display panel 21 is the light-incoming surface of the liquid-crystal display panel 21, i.e., the surface of the liquid-crystal display panel 21 at the side distal to the light-exiting surface. In a particular implementation, the backlight firstly passes through the optical film 23 and the adhering layer 22, and subsequently enters the liquid-crystal display panel 21.

As an example, the adhering layer 22 may include an optical adhesive such as an ultraviolet rays (UV) adhesive, an optical clear resin (OCR) adhesive, an optically clear adhesive (OCA) adhesive and a poval environmental protection (PVA) adhesive, which is not limited in the present disclosure.

As an example, the optical film 23 may include optical film layers such as a light diffusing layer, a prism layer and a brightness enhancing film, which is not limited in the present disclosure.

As shown in FIG. 2, full adhesion is realized between the liquid-crystal display panel 21 and the optical film 23 by using the adhering layer 22, which is different from the edge adhesion between the liquid-crystal display panel and the optical film shown in FIG. 1. The liquid-crystal display panel 21, the adhering layer 22 and the optical film 23 shown in FIG. 2 form a fully adhered structure.

Figure 14:
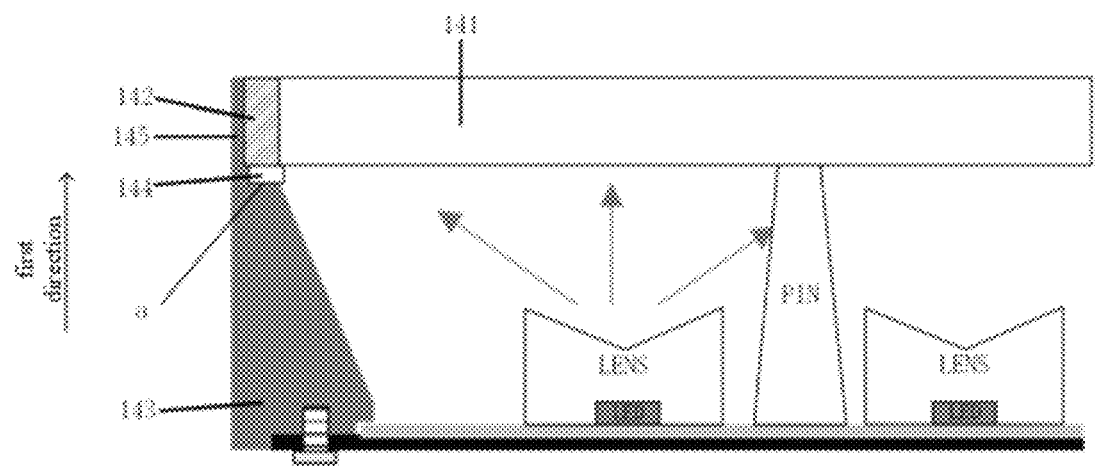
FIG. 14 schematically shows a schematic sectional structural diagram of the fourth particular implementation of the displaying module according to the present disclosure.
Figure 15:
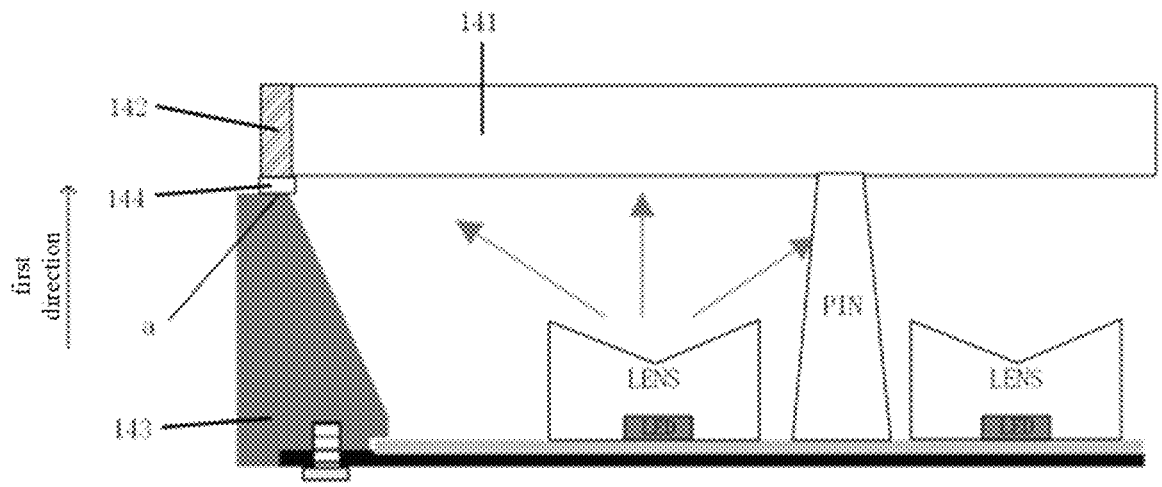
FIG. 15 schematically shows a schematic sectional structural diagram of the fifth particular implementation of the displaying module according to the present disclosure.
Figure 16:
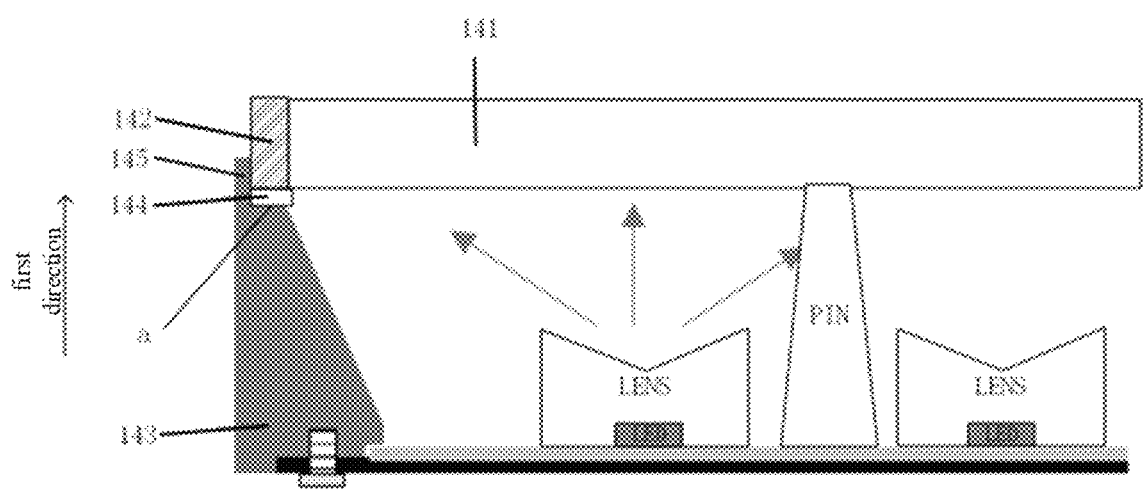
FIG. 16 schematically shows a schematic sectional structural diagram of the sixth particular implementation of the displaying module according to the present disclosure.

In the displaying module according to the present disclosure, because the liquid-crystal display panel 21 and the optical film 23 are fully adhered by using the adhering layer 22, the liquid-crystal display panel 21 can serve as the bearing plate of the optical film 23, and the optical film 23 no longer requires the glass diffuser plate to serve as the bearing plate, whereby no middle frame is required to serve as the carrier of the glass diffuser plate. As shown in FIG. 14 to FIG. 16, the fully adhered structure 141 formed by the liquid-crystal display panel 21, the adhering layer 22 and the optical film 23 can be directly carried on a supporting platform 143 of the border frame.

Because in the displaying module according to the present disclosure the glass diffuser plate and the middle frame can be omitted, the optical efficiency can be increased by at least 10%, to increase the luminous efficiency, and reduce the power consumption and the cost of the displaying module, whereby the displaying module is lighter and thinner. The no-middle-frame design can thoroughly eliminate the hidden trouble that the middle frame might shield the displayed frame, and solve the problems of the middle frame of the extremely-narrow-border-frame displaying modules with a complicated design, a tedious fabricating process, and a high difficulty and a low efficiency in the module assembling.

Optionally, the edge of the liquid-crystal display panel 21, the edge of the adhering layer 22 and the edge of the optical film 23 are flush with each other, as shown in FIG. 2. In other words, both of the orthographic projections of the adhering layer 22 and the optical film 23 on the liquid-crystal display panel 21 completely overlap with the liquid-crystal display panel 21.

Because the optical film 23 can homogenize and weaken the backlight-source light rays, when all of the edges of the adhering layer 22 and the optical film 23 are flush with the edge of the liquid-crystal display panel 21, the light rays that have passed through and been weaken by the optical film 23 subsequently pass through the non-active area of the liquid-crystal display panel 21, which can greatly lower the degrees of the light leakage at the front surface and the lateral side surface of the liquid-crystal display panel 21, to reduce the edge light leakage.

Figure 3:
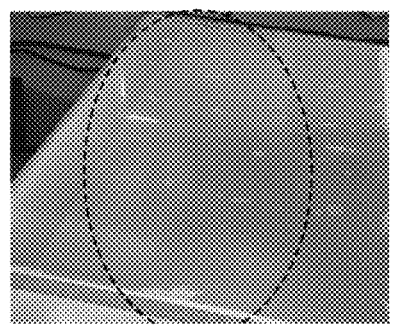
FIG. 3 shows a picture with a rainbow-fringe imperfect.

In order to realize light convergence or light diffusion, the optical film 23 is usually provided with periodic microstructures. After the optical film 23 having the periodic microstructures and the liquid-crystal display panel 21 are fully adhered, when light rays pass through the optical film 23 having the periodic microstructures and subsequently pass through the pixel structures periodically arranged in the liquid-crystal display panel 21, resulting in occurring the light interference, and accordingly generating the rainbow fringe shown in FIG. 3.

The inventor has found that, by adhering a specially designed polarizer (for example, a polarizer whose haze value is 55%) to the surface of the liquid-crystal display panel 21, the rainbow fringe can be eliminated. However, such a specially designed polarizer has a very high price.

Figure 7:
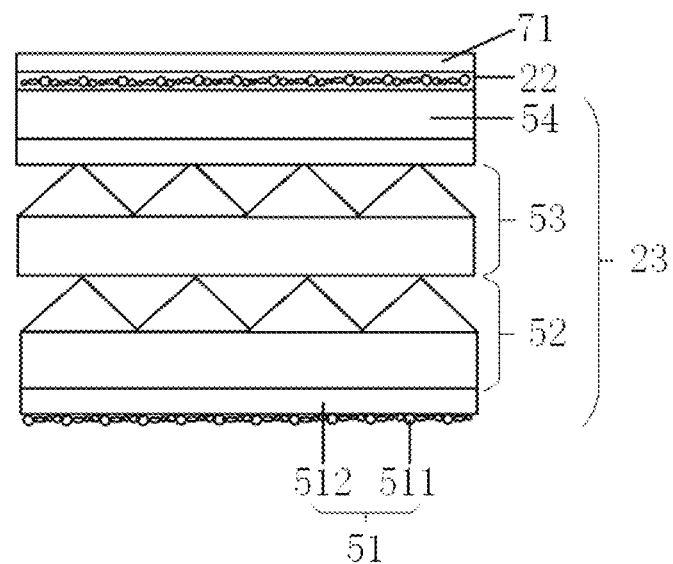
FIG. 7 schematically shows a schematic sectional structural diagram of the second type of composite film according to the present disclosure.
Figure 8:
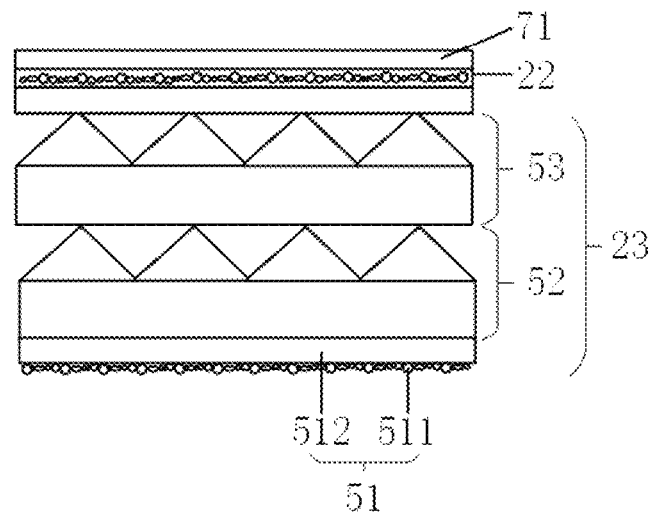
FIG. 8 schematically shows a schematic sectional structural diagram of the third type of composite film according to the present disclosure.

In order to eliminate the rainbow fringe, in an alternative implementation, the adhering layer 22 is an atomized adhering layer 22. Referring to FIG. 7 and FIG. 8, the atomized adhering layer 22 may, for example, include an adhesive layer and diffusing particles dispersed in the adhesive layer. The atomized adhering layer 22 is the haze adhesive layer.

In a particular implementation, the atomized adhering layer 22 may also be another film layer that can scatter the incident light rays and has the property of adhesive bonding, which is not limited in the present disclosure.

Because the atomized adhering layer 22 can scatter the incident light rays, it can break up the light rays with a regularity exiting from the optical film 23. Accordingly, the lights entering the liquid-crystal display screen become irregular scattered lights, and the irregular scattered lights, when passing through the pixel structures periodically arranged, do not have light interference. Therefore, the rainbow fringe can be eliminated, and, especially, the rainbow fringe is eliminated before the light rays entering the liquid-crystal display panel 21.

Additionally, by disposing the adhering layer 22 as the atomized adhering layer 22 to eliminate the rainbow fringe, as compared with the solution in which a specially designed polarizer is adhered, the cost can be reduced.

The adhesive layer in the atomized adhering layer 22 may include one or more types of optical adhesives such as an UV adhesive, an OCR adhesive, an OCA adhesive and a PVA adhesive.

The diffusing particles in the atomized adhering layer 22 may include one or more types of organic particles such as polyolefin, polystyrene, polyamide, polyurethane and melamine, and may also include one or more types of inorganic particles such as silicon, silicon oxide, titanium oxide, aluminium oxide and zirconium oxide, which is not limited in the present disclosure.

The thickness of the atomized adhering layer 22 may be determined according to the particular type of the adhesive layer. For example, when the adhesive layer is an OCA sheet-material adhesive, the range of the thickness of the atomized adhering layer 22 may be 50 μm-300 μm. When the adhesive layer is an OCR water glue, the range of the thickness of the atomized adhering layer 22 may be 25 μm-150 μm. When the adhesive layer is a PVA adhesive, the range of the thickness of the atomized adhering layer 22 may be 20 μm-100 μm. When the adhesive layer is an UV water glue, the range of the thickness of the atomized adhering layer 22 may be 20 μm-100 μm.

Optionally, the haze value of the atomized adhering layer 22 may be larger than or equal to 60%. When the haze value of the atomized adhering layer 22 may be larger than or equal to 60%, that can thoroughly eliminate the rainbow fringe, improve the effect of displaying of the displaying module, and improve the frame quality.

In a particular implementation, the haze value of the atomized adhering layer 22 may be controlled by the proportion of the diffusing particles filled into the adhesive layer.

Figure 4:
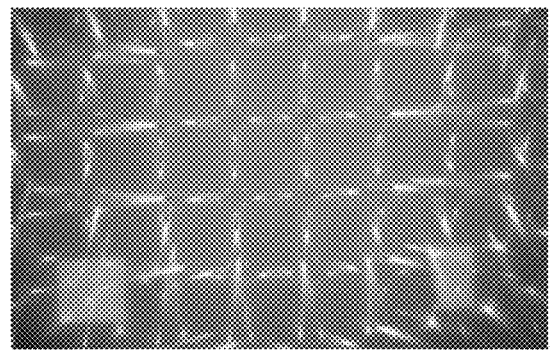
FIG. 4 shows a picture with a diamond-fringe imperfect.

When the displaying module employs direct-type backlight sources and the light sources are periodically regularly arranged, because in the displaying module according to the present disclosure the glass diffuser plate is omitted, and the light rays, without being scattered by the glass diffuser plate, directly enter the optical film 23 and pass through the periodic microstructures in the optical film 23, light interference occurs, thereby generating a diamond-fringe imperfect. If the optical film 23 includes a single prism layer, a horizontal diamond fringe is generated, and if the optical film 23 includes double prism layers, a net-like diamond fringe is generated, as shown in FIG. 4.

The inventor has found that, by configuring that the adhering layer 22 is the atomized adhering layer 22, the diamond-fringe imperfect can be ameliorated. However, in order to eliminate the diamond fringe, the haze value of the atomized adhering layer 22 is required to be larger than or equal to 95%. However, an excessively high haze value of the atomized adhering layer 22 might result in an adhesion imperfect.

In order to eliminate the diamond fringe, in an alternative implementation, as shown in FIG. 5 and FIGS. 7 to 12, the optical film 23 includes a first light diffusing layer 51, and the first light diffusing layer 51 is distal to the liquid-crystal display panel 21 in the optical film 23. In other words, the first light diffusing layer 51 is adjacent to the light-coming side of the optical film 23. The first light diffusing layer 51 is a film layer that can enable the incident light rays to be scattered.

Because the first light diffusing layer 51 can scatter the incident light rays, by disposing the first light diffusing layer 51 in the optical film 23, the light rays coming from the backlight sources periodically regularly arranged can be scattered, and the irregular scattered lights, when passing through the periodic microstructures in the optical film 23, do not have light interference, which can eliminate the diamond fringe.

Optionally, the haze value of the first light diffusing layer 51 is larger than or equal to 75%. When the haze value of the first light diffusing layer 51 is larger than or equal to 75%, the diamond fringe can be thoroughly eliminated.

As an example, as shown in FIG. 5 and FIGS. 7 to 9, the first light diffusing layer 51 may include a first matrix layer 512 and a first atomizing-particle layer 511 that are arranged in layer configuration, and the first atomizing-particle layer 511 is disposed at the side of the first matrix layer 512 distal to the liquid-crystal display panel 21. In other words, the first matrix layer 512 is disposed at the side of the first atomizing-particle layer 511 that is adjacent to the liquid-crystal display panel 21. In such a case, the surface of the first atomizing-particle layer 511 distal to the first matrix layer 512 is the light-incoming surface of the optical film 23.

Optionally, the haze value of the first atomizing-particle layer 511 may be larger than or equal to 75%.

In the present example, the first atomizing-particle layer 511 may be fabricated by spray-coating the diffusing particles onto the surface of the first matrix layer 512.

In a particular implementation, the first light diffusing layer 51 may also be fabricated by filling the diffusing particles into a matrix (for example, polyethylene glycol terephthalate), and the corresponding first light diffusing layer 51 is a conventional diffusion sheet structure.

In order to further increase the degree of the lightness and thinness of the displaying module, to reduce the load of the liquid-crystal display panel 21, the primary material of the first matrix layer 512 may be a polymer resin, for example, polyethylene glycol terephthalate (PET), which is not limited in the present disclosure.

Figure 5:
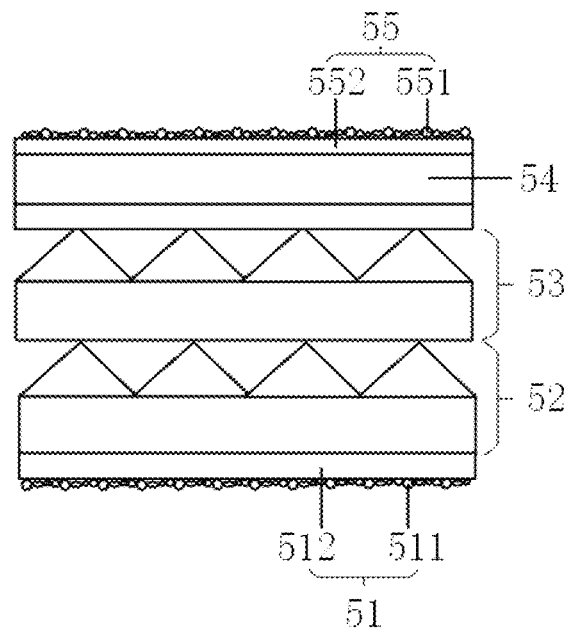
FIG. 5 schematically shows a schematic sectional structural diagram of the first type of composite film according to the present disclosure.
Figure 9:
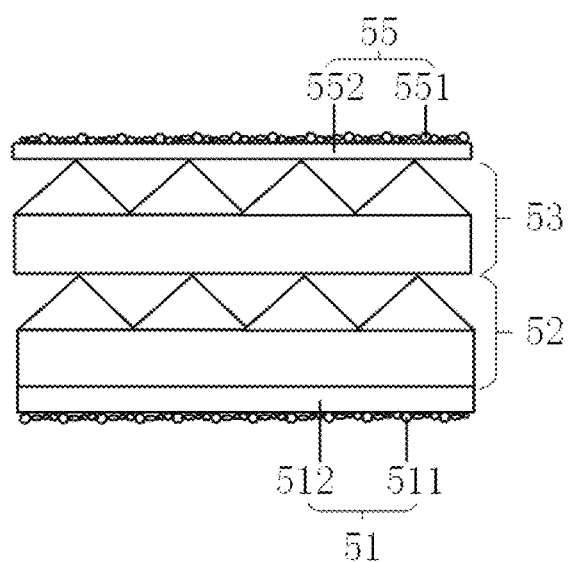
FIG. 9 schematically shows a schematic sectional structural diagram of the fourth type of composite film according to the present disclosure.

Optionally, as shown in FIG. 5 or 9, the optical film 23 further includes a second light diffusing layer 55, and the second light diffusing layer 55 is adjacent to the liquid-crystal display panel 21 in the optical film 23. In other words, the second light diffusing layer 55 is adjacent to the light exiting side in the optical film 23. The second light diffusing layer is a film layer that can enable the incident light rays to be scattered.

As an example, as shown in FIG. 5 or 9, the second light diffusing layer 55 may include a second matrix layer 552 and a second atomizing-particle layer 551 that are arranged in layer configuration, and the second atomizing-particle layer 551 is disposed at the side of the second matrix layer 552 that is adjacent to the liquid-crystal display panel 21. In other words, the second matrix layer 552 is disposed at the side of the second atomizing-particle layer 551 distal to the liquid-crystal display panel 21. In such a case, the surface of the second atomizing-particle layer 551 distal to the second matrix layer 552 is the light-exiting surface of the optical film 23.

In the present example, the second atomizing-particle layer 551 may be fabricated by spray-coating the diffusing particles onto the surface of the second matrix layer 552.

In a particular implementation, the second light diffusing layer 55 may also be fabricated by filling the diffusing particles into a matrix (for example, polyethylene glycol terephthalate), and the corresponding second light diffusing layer 55 is a conventional diffusion sheet structure.

In order to further increase the degree of the lightness and thinness of the displaying module, to reduce the load of the liquid-crystal display panel 21, the primary material of the second matrix layer 552 may be a polymer resin, for example, PET, which is not limited in the present disclosure.

Optionally, as shown in FIGS. 5 to 12, the optical film 23 may include a first prism layer 52 and a second prism layer 53. The first prism layer 52 and the second prism layer 53 can serve to converge and gather the incident light rays.

Figure 6:
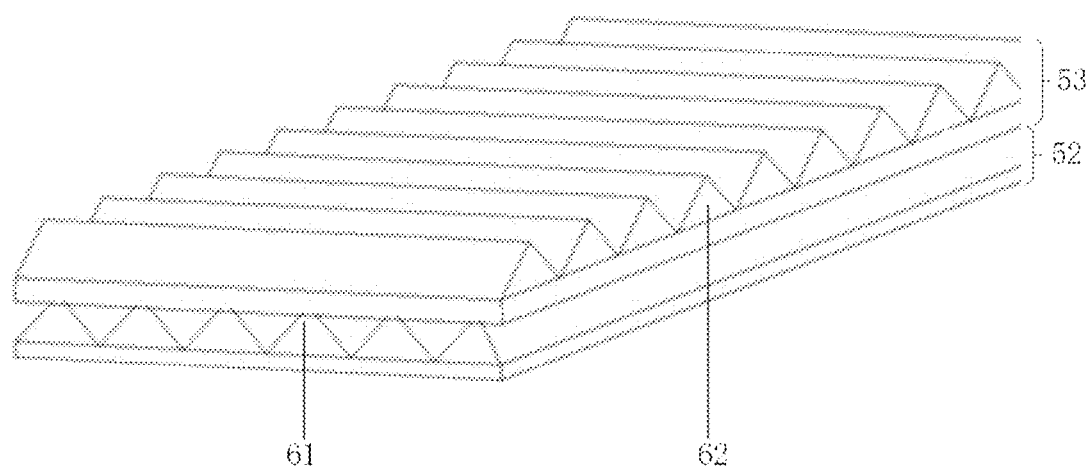
FIG. 6 schematically shows a schematic sectional structural diagram of a first prism layer and a second prism layer according to the present disclosure.

As shown in FIG. 6, the first prism layer 52 may include a plurality of first prism columns 61 parallel to each other, the second prism layer 53 may include a plurality of second prism columns 62 parallel to each other, and the extending direction of the first prism columns 61 and the extending direction of the second prism columns 62 are perpendicular to each other.

It should be noted that the included angle between the extending direction of the first prism columns 61 and the extending direction of the second prism columns 62 may also be other angles that are larger than 0° and less than 180°, which is not limited in the present disclosure.

Referring to FIG. 5, the optical film 23 may include at least one of the following film layers: a first light diffusing layer 51 arranged in layer configuration, a first prism layer 52, a second prism layer 53, a brightness enhancing film 54 and a second light diffusing layer 55, and the first light diffusing layer 51 is furthest from the liquid-crystal display panel 21.

The brightness enhancing film 54 is a thin film or thin sheet that can increase the utilization ratio of the light rays, and may particularly be a prismatic lens, a micro-prismatic lens, a reflection-type polarizer and so on, which is not limited in the present disclosure.

The optical film 23 may, according to practical demands, be selectively provided with one or more optical film layers such as the first light diffusing layer 51, the first prism layer 52, the second prism layer 53, the brightness enhancing film 54 and the second light diffusing layer 55, which is not limited in the present disclosure.

In a particular implementation, the optical film 23 may also include an adhesive layer (not shown in the drawings) disposed between two neighboring film layers.

In order to further increase the degree of the lightness and thinness of the displaying module, in an alternative implementation, at least one of the film layers included by the optical film 23 forms a composite film together with the adhering layer 22; and/or at least two of the film layers included by the optical film 23 form the composite film.

The composite film refers to two or more optical film layers that are integrated into one film layer. Therefore, by using the composite film, the adhering process can be simplified.

Optionally, at least two of the film layers included by the optical film 23 may form the composite film.

For example, the optical film 23 may include one or more of the following composite films: (1) a composite film formed by the first prism layer 52, the second prism layer 53 and the brightness enhancing film 54, for example, the composite film 102 shown in FIG. 10; (2) a composite film formed by the first light diffusing layer 51, the first prism layer 52, the second prism layer 53 and the brightness enhancing film 54; (3) a composite film formed by the first prism layer 52, the second prism layer 53 and the second light diffusing layer 55; (4) a composite film formed by the first light diffusing layer 51, the first prism layer 52, the second prism layer 53 and the second light diffusing layer 55, as shown in FIG. 9; (5) a composite film formed by the first light diffusing layer 51, the first prism layer 52 and the second prism layer 53; (6) a composite film formed by the first light diffusing layer 51, the first prism layer 52, the second prism layer 53, the brightness enhancing film 54 and the second light diffusing layer 55, as shown in FIG. 5; (7) a composite film formed by the first prism layer 52 and the second prism layer 53, for example, the composite film 112 shown in FIG. 11; and so on.

Figure 12:
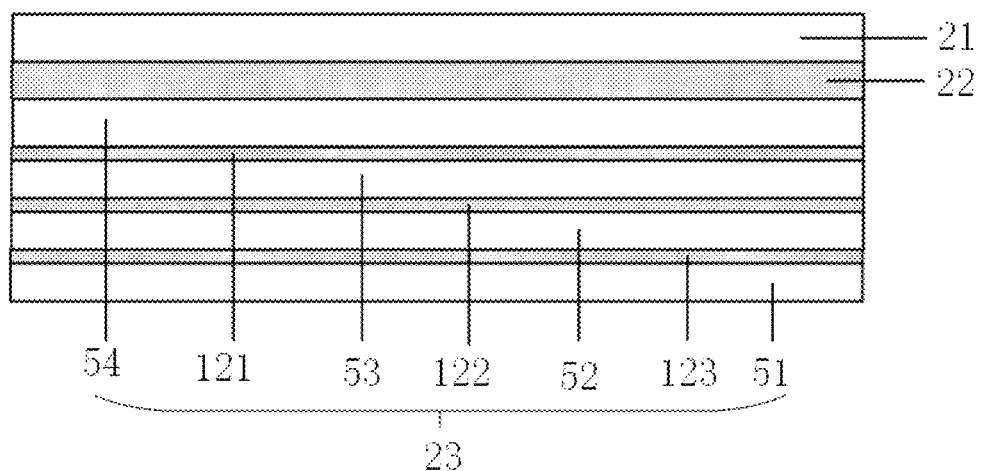
FIG. 12 schematically shows a schematic sectional structural diagram of the third particular implementation of the displaying module according to the present disclosure.

As another example, the optical film 23 may include one or more of the following combinations of monolayer films: (1) the combination of the first light diffusing layer 51, the first prism layer 52, the second prism layer 53 and the brightness enhancing film 54, as shown in FIG. 12; (2) the combination of the first light diffusing layer 51, the first prism layer 52, the second prism layer 53 and the second light diffusing layer 55; (3) the combination of the first prism layer 52, the second prism layer 53 and the brightness enhancing film 54; (4) the combination of the first prism layer 52, the second prism layer 53 and the second light diffusing layer 55; (5) the combination of the first light diffusing layer 51, the first prism layer 52 and the second prism layer 53; and so on.

Optionally, one or more of the film layers included by the adhering layer 22 and the optical film 23 may form a composite film.

As an example, as shown in FIG. 7, the adhering layer 22 forms a composite film together with the brightness enhancing film 54, the second prism layer 53, the first prism layer 52 and the first light diffusing layer 51, and the composite film may further include a release liner 71 disposed at the side of the adhering layer 22 distal to the first light diffusing layer 51.

As shown in FIG. 8, the adhering layer 22 forms a composite film together with the second prism layer 53, the first prism layer 52 and the first light diffusing layer 51, and the composite film may further include a release liner 71 disposed at the side of the adhering layer 22 distal to the first light diffusing layer 51.

The displaying module according to the present disclosure may include one or more composite films, which is not limited in the present disclosure.

As an example, as shown in FIG. 7, the optical film 23 includes the first light diffusing layer 51, the first prism layer 52, the second prism layer 53 and the brightness enhancing film 54 that are arranged in layer configuration, the adhering layer 22 forms a composite film together with the optical film 23, and the adhering layer 22 is located at the side of the brightness enhancing film 54 that is adjacent to the liquid-crystal display panel 21.

As an example, as shown in FIG. 8, the optical film 23 includes the first light diffusing layer 51, the first prism layer 52 and the second prism layer 53 that are arranged in layer configuration, the adhering layer 22 forms a composite film together with the optical film 23, and the adhering layer 22 is located at the side of the second prism layer 53 that is adjacent to the liquid-crystal display panel 21.

As an example, as shown in FIG. 5, the optical film 23 includes the first light diffusing layer 51, the first prism layer 52, the second prism layer 53, the brightness enhancing film 54 and the second light diffusing layer 55 that are arranged in layer configuration. The first light diffusing layer 51, the first prism layer 52, the second prism layer 53, the brightness enhancing film 54 and the second light diffusing layer 55 in the optical film 23 form a composite film. In the present example, the adhering layer 22 may be a monolayer film.

As an example, as shown in FIG. 9, the optical film 23 includes the first light diffusing layer 51, the first prism layer 52, the second prism layer 53 and the second light diffusing layer 55 that are arranged in layer configuration. The first light diffusing layer 51, the first prism layer 52, the second prism layer 53 and the second light diffusing layer 55 in the optical film 23 form a composite film. In the present example, the adhering layer 22 may be a monolayer film.

Figure 10:
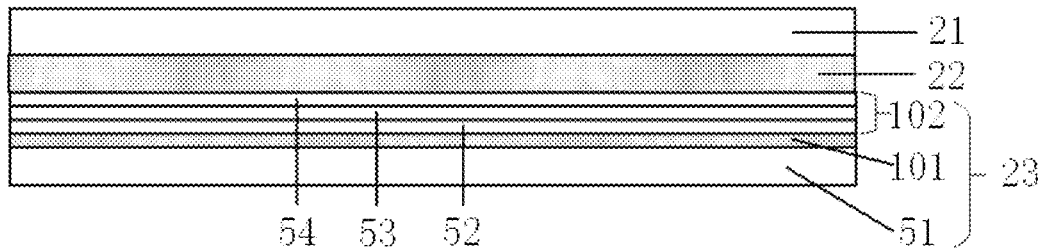
FIG. 10 schematically shows a schematic sectional structural diagram of the first particular implementation of the displaying module according to the present disclosure.

As an example, as shown in FIG. 10, the optical film 23 includes the first light diffusing layer 51, the first prism layer 52, the second prism layer 53 and the brightness enhancing film 54 that are arranged in layer configuration. The first light diffusing layer 51 is a monolayer film, and the first prism layer 52, the second prism layer 53 and the brightness enhancing film 54 form a composite film. In the present example, the adhering layer 22 may be a monolayer film.

Figure 11:
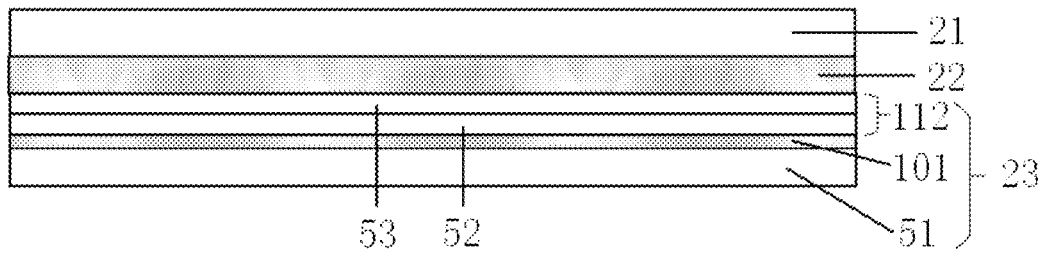
FIG. 11 schematically shows a schematic sectional structural diagram of the second particular implementation of the displaying module according to the present disclosure.

As an example, as shown in FIG. 11, the optical film 23 includes the first light diffusing layer 51, the first prism layer 52 and the second prism layer 53 that are arranged in layer configuration. The first light diffusing layer 51 is a monolayer film, and the first prism layer 52 and the second prism layer 53 form a composite film. In the present example, the adhering layer 22 may be a monolayer film.

As shown in FIG. 12, the optical film 23 includes the first light diffusing layer 51, the first prism layer 52, the second prism layer 53 and the brightness enhancing film 54 that are arranged in layer configuration. All of the first light diffusing layer 51, the first prism layer 52, the second prism layer 53 and the brightness enhancing film 54 are a monolayer film. In the present example, the adhering layer 22 may be a monolayer film.

Figure 13A:
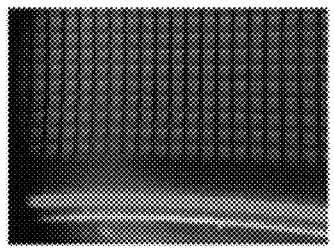
FIG. 13A, FIG. 13B and FIG. 13C schematically show diagrams of the effect of displaying of some types of displaying module.

The inventor has found that, because the black matrix at the edge of the extremely-narrow-border-frame screen has a very low width, which is usually less than 1 mm, the black matrix cannot completely shield the edge light leakage, which results in a serious edge light leakage of the liquid-crystal display panel 21, as shown in FIG. 13A.

In order to solve the problem of edge light leakage, in an alternative implementation, as shown in FIGS. 14 to 16, the displaying module further includes: a light shielding layer 142, disposed at a lateral side surface of the fully adhered structure 141, configured for blocking the light rays at the lateral side surface.

Figure 13B:
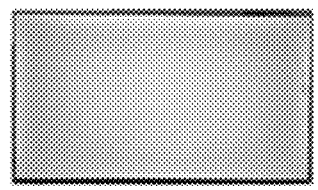
Figure 13C:
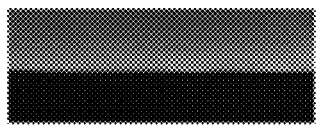

By disposing the light shielding layer 142 at the periphery of the fully adhered structure 141, the edge light leakage can be blocked, to eliminate the light leakage in the extremely-narrow-border-frame display screen caused by the low width of the black matrix. FIG. 13B and FIG. 13C show diagrams of the effect of displaying of the displaying module provided with the light shielding layer 142. By comparison with FIG. 13A, it can be found that the light leakage of the displaying module provided with the light shielding layer 142 is obviously ameliorated.

The material of the light shielding layer 142 includes at least one material that can absorb light rays such as a black adhesive, a black printing ink and a light shielding adhesive tape.

In a particular implementation, the displaying module may further include a border frame.

Optionally, as shown in FIGS. 14 to 16, the border frame may include: a supporting platform 143, located on the light-coming side of the fully adhered structure 141, for supporting the fully adhered structure 141. The supporting platform 143 is adjacent to the optical film 23.

The surface of the supporting platform 143 that is adjacent to the fully adhered structure 141 is a supporting surface a, and the orthographic projection of the supporting surface a on the liquid-crystal display panel 21 does not intersect or overlap with the active area. That can ensure that the supporting platform 143 does not shield the active area.

The orthographic projection of the supporting surface a on the liquid-crystal display panel 21 may intersect or overlap with the non-active area of the liquid-crystal display panel 21.

The orthographic projection of the supporting surface a on the liquid-crystal display panel 21 may intersect or overlap with the orthographic projection of the light shielding layer 142 on the liquid-crystal display panel 21.

Optionally, the border frame may further include: an adhesively bonding layer 144, disposed between the supporting surface a and the fully adhered structure 141, configured for adhesively bonding the fully adhered structure 141 to the supporting platform 143.

The material of the adhesively bonding layer 144 may include a black adhesive, a light shielding adhesive tape, a transparent adhesive or a transparent adhesive tape.

Optionally, the border frame may further include: an extending part 145, disposed on the supporting surface, wherein the extending part 145 extends to the lateral side surface of the fully adhered structure 141 in a first direction, wherein the first direction refers to the direction pointing from the optical film 23 to the liquid-crystal display panel 21.

The extending part 145 is located at the side of the light shielding layer 142 distal to the fully adhered structure 141. The light shielding layer 142 and the extending part 145 may be adhesively bonded to each other or independent of each other.

The extending part 145 may be selectively disposed according to practical demands. The displaying modules shown in FIGS. 14 and 16 are provided with the extending part 145, and the displaying module shown in FIG. 15 is not provided with the extending part 145. The extending length of the extending part 145 in the first direction may also be set according to practical demands, and is not limited in the present disclosure.

As an example, the light shielding layer 142 and the extending part 145 may be adhesively bonded to each other, and the material of the light shielding layer 142 may include one or more materials that have the properties of light shielding and adhesive bonding such as a black adhesive and a light shielding adhesive tape, which is not limited in the present disclosure.

As an example, the light shielding layer 142 and the extending part 145 may be independent of each other, and the material of the light shielding layer 142 may include one or more materials that have the property of light shielding such as a black printing ink, which is not limited in the present disclosure. It should be noted that the material of the light shielding layer 142 may also be the materials that have the property of adhesive bonding such as a black adhesive and a light shielding adhesive tape, and in order to ensure that the light shielding layer 142 and the extending part 145 are independent of each other, the viscous material may be solidified before the fully adhered structure 141 and the border frame are assembled, thereby realizing that the light shielding layer 142 and the extending part 145 are independent of each other.

When the supporting surface a is not provided with the extending part 145 (as shown in FIG. 15), or when the supporting surface a is provided with the extending part 145 but the extending part 145 does not extend to the lateral side surface of the fully adhered structure 141, the material of the adhesively bonding layer 144 may include the materials that have the properties of light shielding and adhesive bonding such as a black adhesive and a light shielding adhesive tape, to prevent light leakage at that position.

As shown in FIG. 14 or 16, when the supporting surface is provided with the extending part 145 and the extending part 145 extends to the lateral side surface of the fully adhered structure 141, the material of the adhesively bonding layer 144 may be a viscous material having a high transparency such as a transparent adhesive or a transparent adhesive tape, to prevent the adhesively bonding layer 144 from affecting the effect of displaying when it is bonded to the active area.

In a particular implementation, the displaying module may further include elements such as a backlight source, a light guide plate and a reflector plate, which is not limited in the present disclosure.

The present disclosure provides a displaying device, wherein the displaying device includes the displaying module according to any one of the above embodiments.

Because the displaying device includes the displaying module stated above, a person skilled in the art can understand that the displaying device has the advantages of the displaying module according to the present disclosure, which are not discussed further herein.

It should be noted that the displaying device according to the present embodiment may be any products or components that have the function of 2D or 3D displaying, such as an electronic paper, a mobile phone, a tablet personal computer, a TV set, a notebook computer, a digital photo frame and a navigator.

The present disclosure provides a manufacturing method of a displaying module, wherein referring to FIG. 2, the displaying module includes a liquid-crystal display panel, an adhering layer and an optical film that are arranged in layer configuration. The manufacturing method includes:

Step S01: providing the liquid-crystal display panel 21, the adhering layer 22 and the optical film 23.

Step S02: adhering the adhering layer 22 and the optical film 23 to the shadow surface of the liquid-crystal display panel 21, to obtain a fully adhered structure 141, wherein the adhering layer 22 is adjacent to the liquid-crystal display panel 21, and is configured for adhesively bonding the liquid-crystal display panel 21 and the optical film 23; and the orthographic projection of the adhering layer 22 on the liquid-crystal display panel 21 covers at least the active area of the liquid-crystal display panel 21, and the orthographic projection of the optical film 23 on the liquid-crystal display panel 21 covers at least the active area of the liquid-crystal display panel 21.

By using the manufacturing method according to the present disclosure, the displaying module according to any one of the above embodiments can be fabricated.

In an alternative implementation, the adhering layer 22 and the optical film 23 form a composite film, and, as shown in FIGS. 7 and 8, the composite film further includes a release liner 71 disposed at the side of the adhering layer 22 distal to the optical film 23.

Correspondingly, in the step S02, the step of adhering the adhering layer 22 and the optical film 23 to the shadow surface of the liquid-crystal display panel 21 may include: stripping the release liner 71 of the composite film; and adhering the adhering layer 22 of the composite film where the stripping of the release liner 71 is completed to the shadow surface of the liquid-crystal display panel 21, to synchronously complete the adhesion between the adhering layer 22 and the liquid-crystal display panel 21 and the adhesion between the optical film 23 and the liquid-crystal display panel 21.

As an example, the steps for fabricating the displaying module may include:

Step 11: fabricating the first prism layer 52 and the second prism layer 53 on a PET matrix; fabricating the brightness enhancing film 54; coating the diffusing particles at the surface of the first matrix layer 512, to obtain the first light diffusing layer 51; subsequently adhering the first light diffusing layer 51, the first prism layer 52, the second prism layer 53 and the brightness enhancing film 54 according to the structure shown in FIG. 7; and subsequently forming the adhering layer 22 and the release liner 71 at the surface of the brightness enhancing film 54 at the side distal to the first light diffusing layer 51, to obtain the composite film shown in FIG. 7; or fabricating the first prism layer 52 and the second prism layer 53 on a PET matrix; coating the diffusing particles at the surface of the first matrix layer 512, to obtain the first light diffusing layer 51; subsequently adhering the first light diffusing layer 51, the first prism layer 52 and the second prism layer 53 according to the structure shown in FIG. 8; and subsequently forming the adhering layer 22 and the release liner 71 at the side of the second prism layer 53 distal to the first light diffusing layer 51, to obtain the composite film shown in FIG. 8;

Step 12: adsorbing the light-exiting surface of the liquid-crystal display panel 21 to an operation base station, and washing and cleaning the shadow surface, to prevent foreign matters from affecting the effect of adhesion;

Step 13: adsorbing the composite film shown in FIG. 7 or 8 to the operation base station, wherein the first light diffusing layer 51 is adjacent to the operation base station to be adsorbed; and subsequently removing the release liner 71, and adhering the adhering layer 22 to the shadow surface of the liquid-crystal display panel 21;

Step 14: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141; and Step 15: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). If the extending part 145 is disposed, the light shielding layer 142 and the extending part 145 are not adhesively bonded to each other, and they may be independent of each other.

In an alternative implementation, the optical film 23 includes a first optical film, and the first optical film is a monolayer film or a composite film. The adhering layer 22 is a monolayer film, and the monolayer film of the adhering layer 22 further includes a light release liner disposed at a first side of the adhering layer 22 and a heavy release liner disposed at a second side of the adhering layer 22.

Correspondingly, in the step S02, the step of adhering the adhering layer 22 and the optical film 23 to the shadow surface of the liquid-crystal display panel 21 may include: stripping the light release liner; adhering the first side of the adhering layer 22 to the shadow surface of the liquid-crystal display panel 21; stripping the heavy release liner; and adhering the light-exiting surface of the first optical film to the second side of the adhering layer 22.

As an example, the first optical film is the composite film shown in FIG. 5 or 9, and the steps for fabricating the displaying module may include:

Step 21: fabricating the first prism layer 52 and the second prism layer 53 on a PET matrix; fabricating the brightness enhancing film 54; coating the diffusing particles at the surface of the first matrix layer 512, to obtain the first light diffusing layer 51; coating the diffusing particles at the surface of the second matrix layer 552, to obtain the second light diffusing layer 55; and subsequently adhering the first light diffusing layer 51, the first prism layer 52, the second prism layer 53, the brightness enhancing film 54 and the second light diffusing layer 55 according to the structure shown in FIG. 5, to obtain the composite film shown in FIG. 5; or fabricating the first prism layer 52 and the second prism layer 53 on a PET matrix; coating the diffusing particles at the surface of the first matrix layer 512, to obtain the first light diffusing layer 51; coating the diffusing particles at the surface of the second matrix layer 552, to obtain the second light diffusing layer 55; and subsequently adhering the first light diffusing layer 51, the first prism layer 52, the second prism layer 53 and the second light diffusing layer 55 according to the structure shown in FIG. 9, to obtain the composite film shown in FIG. 9;

Step 22: absorbing the light-exiting surface of the liquid-crystal display panel 21 to an operation base station, and washing and cleaning the shadow surface, to prevent foreign matters from affecting the effect of adhesion;

Step 23: taking the monolayer film of the adhering layer 22, absorbing the heavy release liner in the monolayer film to the operation base station, and removing the light release liner (which is easy to remove); subsequently adhering the first side of the adhering layer 22 to the shadow surface of the liquid-crystal display panel 21; and subsequently removing the heavy release liner at the second side;

Step 24: absorbing the composite film shown in FIG. 5 or 9 to the operation base station, wherein the first light diffusing layer 51 is adjacent to the operation base station; and subsequently adhering the second light diffusing layer 55 to the adhering layer 22 located at the shadow surface of the liquid-crystal display panel 21;

Step 25: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141; and Step 26: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

As an example, referring to FIG. 10, the first optical film is a composite film 102 formed by the brightness enhancing film 54, the first prism layer 52 and the second prism layer 53; or referring to FIG. 11, the first optical film is a composite film 112 formed by the first prism layer 52 and the second prism layer 53, and the steps for fabricating the displaying module may include:

Step 31: fabricating the composite film 102 shown in FIG. 10 or the composite film 112 shown in FIG. 11;

Step 32: absorbing the light-exiting surface of the liquid-crystal display panel 21 to an operation base station, and washing and cleaning the shadow surface, to prevent foreign matters from affecting the effect of adhesion;

Step 33: taking the monolayer film of the adhering layer 22, absorbing the heavy release liner in the monolayer film to the operation base station, and removing the light release liner (which is easy to remove); subsequently adhering the first side of the adhering layer 22 to the shadow surface of the liquid-crystal display panel 21; and subsequently removing the heavy release liner at the second side;

Step 34: absorbing the composite film 102 or the composite film 112 (as shown in FIG. 10 or 11) to the operation base station, wherein the light-incoming surface of the composite film is adjacent to the operation base station; and subsequently adhering the light-exiting surface of the composite film to the adhering layer 22 located at the shadow surface of the liquid-crystal display panel 21;

Step 35: taking a monolayer film of an OCA adhesive 101, absorbing the heavy release liner in the monolayer film to the operation base station, and removing the light release liner (which is easy to remove); subsequently adhering the OCA adhesive 101 to the surface of the composite film distal to the liquid-crystal display panel 21; and subsequently removing the heavy release liner;

Step 36: taking a monolayer film of the first light diffusing layer 51, absorbing the light-incoming surface of the first light diffusing layer 51 to the operation base station, and adhering the light-exiting surface to the surface of the OCA adhesive 101;

Step 37: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141 shown in FIG. 10 or 11; and Step 38: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

As an example, the first optical film is a monolayer film, for example, the brightness enhancing film 54 shown in FIG. 12, and the steps for fabricating the displaying module may include:

Step 41: absorbing the light-exiting surface of the liquid-crystal display panel 21 to an operation base station, and washing and cleaning the shadow surface, to prevent foreign matters from affecting the effect of adhesion;

Step 42: taking the monolayer film of the adhering layer 22, absorbing the heavy release liner in the monolayer film to the operation base station, and removing the light release liner (which is easy to remove); subsequently adhering the first side of the adhering layer 22 to the shadow surface of the liquid-crystal display panel 21; and subsequently removing the heavy release liner at the second side;

Step 43: absorbing the brightness enhancing film 54 to the operation base station, wherein the light-incoming surface is adjacent to the operation base station; and subsequently adhering the light-exiting surface of the brightness enhancing film 54 to the adhering layer 22 located at the shadow surface of the liquid-crystal display panel 21;

Step 44: taking a monolayer film of a first OCA adhesive 121, absorbing the heavy release liner in the monolayer film to the operation base station, and removing the light release liner (which is easy to remove); subsequently adhering the first OCA adhesive 121 to the surface of the brightness enhancing film 54 distal to the liquid-crystal display panel 21; and subsequently removing the heavy release liner;

Step 45: taking the second prism layer 53, and absorbing the light-incoming surface of the second prism layer 53 to the operation base station, wherein the light-exiting surface is adhered to the surface of the first OCA adhesive 121;

Step 46: taking a monolayer film of a second OCA adhesive 122, absorbing the heavy release liner in the monolayer film to the operation base station, and removing the light release liner (which is easy to remove); subsequently adhering the second OCA adhesive 122 to the surface of the second prism layer 53 distal to the liquid-crystal display panel 21; and subsequently removing the heavy release liner;

Step 47: taking the first prism layer 52, and absorbing the light-incoming surface of the first prism layer 52 to the operation base station, wherein the light-exiting surface is adhered to the surface of the second OCA adhesive 122;

Step 48: taking a monolayer film of a third OCA adhesive 123, absorbing the heavy release liner in the monolayer film to the operation base station, and removing the light release liner (which is easy to remove); subsequently adhering the third OCA adhesive 123 to the surface of the first prism layer 52 distal to the liquid-crystal display panel 21; and subsequently removing the heavy release liner;

Step 49: taking a monolayer film of the first light diffusing layer 51, and absorbing the light-incoming surface of the first light diffusing layer 51 to the operation base station, wherein the light-exiting surface is adhered to the surface of the third OCA adhesive 123;

Step 410: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141 shown in FIG. 12; and Step 412: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

In an alternative implementation, the optical film 23 includes a second optical film, and the second optical film is a monolayer film or a composite film. Correspondingly, in the step S02, the step of adhering the adhering layer 22 and the optical film 23 to the shadow surface of the liquid-crystal display panel 21 may include: uniformly coating a haze water glue on the light-exiting surface of the second optical film, wherein the haze water glue includes a glue and diffusing particles dispersed in the glue; adhering the side of the second optical film that is coated by the haze water glue to the shadow surface of the liquid-crystal display panel 21; and solidifying the haze water glue, wherein the solidified haze water glue forms the adhering layer 22.

As an example, the second optical film is the composite film shown in FIG. 5 or 9, and the steps for fabricating the displaying module may include:

Step 51: taking the composite film shown in FIG. 5 or 9, absorbing the light-incoming surface of the composite film to the operation base station, and wiping the surface of the film layer by using a dust-free cloth, to prevent foreign matters from affecting the effect of adhesion, while avoiding wiping by using ethanol;

Step 52: taking a haze water glue, uniformly coating the haze water glue on the light-exiting surface of the composite film, striking off, and pre-solidifying;

Step 53: washing the shadow surface of the liquid-crystal display panel 21, to prevent foreign matters from affecting the effect of adhesion; and subsequently adhering the shadow surface of the liquid-crystal display panel 21 to the side of the composite film that is coated with the haze water glue, and performing final solidification, wherein the solidified haze water glue forms the adhering layer 22;

Step 54: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141; and Step 55: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

As an example, referring to FIG. 10, the second optical film is a composite film 102 formed by the brightness enhancing film 54, the first prism layer 52 and the second prism layer 53; or referring to FIG. 11, the second optical film is a composite film 112 formed by the first prism layer 52 and the second prism layer 53, and the steps for fabricating the displaying module may include:

Step 61: taking the above composite film, absorbing the light-incoming surface of the composite film to the operation base station, and wiping the surface of the film layer by using a dust-free cloth, to prevent foreign matters from affecting the effect of adhesion, while avoiding wiping by using ethanol;

Step 62: taking a haze water glue, uniformly coating the haze water glue on the light-exiting surface of the composite film, striking off, and pre-solidifying;

Step 63: washing the shadow surface of the liquid-crystal display panel 21, to prevent foreign matters from affecting the effect of adhesion; and subsequently adhering the shadow surface of the liquid-crystal display panel 21 to the side of the composite film that is coated with the haze water glue, and performing final solidification, wherein the solidified haze water glue forms the adhering layer 22;

Step 64: taking the first light diffusing layer 51, absorbing the light-incoming surface of the first light diffusing layer 51 to the operation base station, and wiping the surface of the film layer by using a dust-free cloth, to prevent foreign matters from affecting the effect of adhesion, while avoiding wiping by using ethanol; and uniformly coating a water glue on the light-exiting surface of the first light diffusing layer 51, striking off, and pre-solidifying;

Step 65: adhering the light-exiting surface of the first light diffusing layer 51 to the composite film at the back surface of the liquid-crystal display panel 21, and performing final solidification;

Step 66: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141; and Step 67: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

As an example, the second optical film is a monolayer film, for example, the brightness enhancing film 54 shown in FIG. 12, and the steps for fabricating the displaying module may include:

Step 71: taking the brightness enhancing film 54, absorbing the light-incoming surface of the brightness enhancing film 54 to the operation base station, and wiping the surface of the film layer by using a dust-free cloth, to prevent foreign matters from affecting the effect of adhesion, while avoiding wiping by using ethanol;

Step 72: taking a haze water glue, uniformly coating the haze water glue on the light-exiting surface of the brightness enhancing film 54, striking off, and pre-solidifying;

Step 73: washing the shadow surface of the liquid-crystal display panel 21, to prevent foreign matters from affecting the effect of adhesion; and subsequently adhering the shadow surface of the liquid-crystal display panel 21 to the side of the brightness enhancing film 54 that is coated with the haze water glue, and performing final solidification, wherein the solidified haze water glue forms the adhering layer 22;

Step 74: taking the second prism layer 53, the first prism layer 52 and the first light diffusing layer 51, absorbing individually the light-incoming faces of the second prism layer 53, the first prism layer 52 and the first light diffusing layer 51 to the operation base station, and wiping the surfaces of the film layers by using a dust-free cloth, to prevent foreign matters from affecting the effect of adhesion, while avoiding wiping by using ethanol; and uniformly coating a water glue on the light-exiting faces of the second prism layer 53, the first prism layer 52 and the first light diffusing layer 51 individually, striking off, and pre-solidifying;

Step 75: sequentially adhering the second prism layer 53, the first prism layer 52 and the first light diffusing layer 51 to the side of the brightness enhancing film 54 distal to the liquid-crystal display panel 21, and performing final solidification;

Step 76: cutting the optical film 23 and the adhering layer 22 that exceed the edge of the liquid-crystal display panel 21 (for example, by laser cutting), to cause the edges of the liquid-crystal display panel 21, the adhering layer 22 and the optical film 23 to be flush with each other, to obtain the fully adhered structure 141; and Step 77: referring to FIGS. 14 and 16, assembling the fully adhered structure 141 and the border frame, and performing adhesive-dispensing treatment by using a black adhesive to the gap between the extending part 145 and the lateral side surface of the fully adhered structure 141, to form the light shielding layer 142 that adhesively bonds the extending part 145 and the fully adhered structure 141; or referring to FIGS. 14 to 16, performing adhesive-dispensing treatment by using a black adhesive to the lateral side surface of the fully adhered structure 141, solidifying to form the light shielding layer 142 located on the lateral side surface of the fully adhered structure 141, and subsequently assembling the fully adhered structure 141 formed with the light shielding layer 142 and the border frame, to form a suspending screen. In the suspending screen, the extending part 145 may be disposed (as shown in FIGS. 14 and 16) or not disposed (as shown in FIG. 15). When the extending part 145 is disposed, the light shielding layer 142 and the extending part 145 are not adhesively bonded to each other, and they may be independent of each other.

In the above processes, when the monolayer films or the composite films are picked up, hand prints and dust should be avoided to the greatest extent, and the surfaces should be cleaned by using a dry dust-free cloth, while avoiding wiping by using ethanol.

Optionally, after the step S02, the method may further include: performing cleaning and adhesive-sealing to the edges of the optical film 23 and the adhering layer 22, to prevent the optical film 23 from layering.

In an alternative implementation, after the step S02, the method may further include: providing a border frame, wherein the border frame includes an extending part 145; assembling the border frame and the fully adhered structure 141, whereby the extending part 145 is located on a lateral side surface of the fully adhered structure 141; and forming a light shielding layer 142 between the extending part 145 and the fully adhered structure 141, wherein the light shielding layer 142 is configured for blocking the light rays between the extending part 145 and the fully adhered structure 141. The displaying module shown in FIG. 14 or 16 is obtained.

In a particular implementation, the light shielding layer 142 may be formed between the extending part 145 and the fully adhered structure 141 by adhesive dispensing. In the present implementation, the light shielding layer 142 and the extending part 145 may be adhesively bonded to each other.

In an alternative implementation, after the step S02, the method may further include: forming a light shielding layer 142 on a lateral side surface of the fully adhered structure 141, wherein the light shielding layer 142 is configured for blocking the light rays at the lateral side surface; providing a border frame, wherein the border frame includes an extending part 145; and assembling the border frame and the fully adhered structure 141, whereby the extending part 145 is located at the side of the light shielding layer 142 distal to the fully adhered structure 141. The displaying module shown in FIG. 14 or 16 is obtained.

In a particular implementation, the light shielding layer 142 may be formed at the lateral side surface of the fully adhered structure 141 by adhesive dispensing. In the present implementation, the light shielding layer 142 and the extending part 145 may be independent of each other.

It should be noted that the manufacturing method may further comprise more steps, which may be determined according to practical demands, and is not limited in the present disclosure. The detailed description on and the technical effects of the displaying device obtained by using the manufacturing method may refer to the above description on the displaying device, and are not discussed herein further.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The displaying module and the method for manufacturing the same, and the displaying device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that is described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A displaying module comprising a liquid-crystal display panel, an adhering layer and an optical film that are arranged in layer configuration,
   wherein the adhering layer is disposed between a shadow surface of the liquid-crystal display panel and the optical film, and is configured for adhesively bonding the liquid-crystal display panel and the optical film;
   wherein an orthographic projection of the adhering layer on the liquid-crystal display panel covers at least an active area of the liquid-crystal display panel, and an orthographic projection of the optical film on the liquid-crystal display panel covers at least the active area of the liquid-crystal display panel;
   wherein the optical film, the adhering layer and the liquid-crystal display panel form a fully adhered structure; and
   wherein the displaying module further comprises a light shielding layer, disposed on a lateral side surface of the fully adhered structure, configured for blocking light rays at the lateral side surface.

2. The displaying module according to claim 1, wherein an edge of the liquid-crystal display panel, an edge of the adhering layer, and an edge of the optical film are flush with each other.

3. The displaying module according to claim 1, wherein the adhering layer is an atomized adhering layer, and the atomized adhering layer comprises an adhesive layer and diffusing particles dispersed in the adhesive layer.

4. The displaying module according to claim 1, wherein the adhering layer is an atomized adhering layer; and
   a haze value of the atomized adhering layer is larger than or equal to 60%.

5. The displaying module according to claim 1, wherein the optical film comprises a first light diffusing layer, and the first light diffusing layer is distal to the liquid-crystal display panel, and a haze value of the first light diffusing layer is larger than or equal to 75%.

6. The displaying module according to claim 5, wherein the optical film further comprises a second light diffusing layer, and the second light diffusing layer is adjacent to the liquid-crystal display panel;
the first light diffusing layer comprises a first matrix layer and a first atomizing-particle layer that are arranged in layer configuration, and the first atomizing-particle layer is disposed at one side of the first matrix layer distal to the liquid-crystal display panel; and the second light diffusing layer comprises a second matrix layer and a second atomizing-particle layer that are arranged in layer configuration, and the second atomizing-particle layer is disposed at one side of the second matrix layer that is adjacent to the liquid-crystal display panel; and
a primary material of the first matrix layer and a primary material of the second matrix layer are a polymer resin.

7. The displaying module according to claim 1, wherein the optical film comprises a first prism layer and a second prism layer, the first prism layer comprises a plurality of first prism columns parallel to each other, the second prism layer comprises a plurality of second prism columns parallel to each other, and an extending direction of the first prism columns and an extending direction of the second prism columns are perpendicular to each other.

8. The displaying module according to claim 1, wherein a material of the light shielding layer comprises at least one of a black adhesive, a black printing ink and a light shielding adhesive tape.

9. The displaying module according to claim 1, wherein the displaying module further comprises:
a supporting platform, located at a light-coming side of the fully adhered structure, configured for supporting the fully adhered structure, wherein a surface of the supporting platform that is adjacent to the fully adhered structure is a supporting surface, and an orthographic projection of the supporting surface on the liquid-crystal display panel does not intersect or overlap with the active area; and
an adhesively bonding layer, disposed between the supporting surface and the fully adhered structure, configured for adhesively bonding the fully adhered structure to the supporting platform.

10. The displaying module according to claim 9, wherein the displaying module further comprises:
an extending part, disposed on the supporting surface, wherein the extending part extends to the lateral side surface of the fully adhered structure in a first direction, wherein the first direction refers to a direction pointing from the optical film to the liquid-crystal display panel; and
the extending part is located at one side of the light shielding layer distal to the fully adhered structure, and the extending part and the light shielding layer are adhesively bonded to each other or independent of each other.

11. The displaying module according to claim 9, wherein a material of the adhesively bonding layer comprises a black adhesive, a light shielding adhesive tape, a transparent adhesive or a transparent adhesive tape.

12. A displaying device, comprising the displaying module according to claim 1.

13. A manufacturing method of a displaying module, wherein the displaying module comprises a liquid-crystal display panel, an adhering layer and an optical film that are arranged in layer configuration, and the manufacturing method comprises:

providing the liquid-crystal display panel, the adhering layer and the optical film; and
adhering the adhering layer and the optical film to a shadow surface of the liquid-crystal display panel, to obtain a fully adhered structure, wherein the adhering layer is adjacent to the liquid-crystal display panel, and is configured for adhesively bonding the liquid-crystal display panel and the optical film; and an orthographic projection of the adhering layer on the liquid-crystal display panel covers at least an active area of the liquid-crystal display panel, and an orthographic projection of the optical film on the liquid-crystal display panel covers at least the active area of the liquid-crystal display panel;
wherein after the step of obtaining the fully adhered structure, the method further comprises:
providing a border frame, wherein the border frame comprises an extending part;
assembling the border frame and the fully adhered structure, whereby the extending part is located on a lateral side surface of the fully adhered structure; and
forming a light shielding layer between the extending part and the fully adhered structure, wherein the light shielding layer is configured for blocking light rays between the extending part and the fully adhered structure.

14. The manufacturing method according to claim 13, wherein the adhering layer and the optical film form a composite film, and the composite film further comprises a release liner disposed at one side of the adhering layer distal to the optical film; and
the step of adhering the adhering layer and the optical film to the shadow surface of the liquid-crystal display panel comprises:
stripping the release liner of the composite film; and
adhering the adhering layer in the composite film where the stripping of the release liner is completed to the shadow surface of the liquid-crystal display panel, to synchronously complete adhesion between the adhering layer and the liquid-crystal display panel and adhesion between the optical film and the liquid-crystal display panel.

15. The manufacturing method according to claim 13, wherein the optical film comprises a first optical film, the first optical film is a monolayer film or a composite film, the adhering layer is a monolayer film, and the monolayer film of the adhering layer further comprises a light release liner disposed at a first side of the adhering layer and a heavy release liner disposed at a second side of the adhering layer; and the step of adhering the adhering layer and the optical film to the shadow surface of the liquid-crystal display panel comprises:
stripping the light release liner;
adhering the first side of the adhering layer to the shadow surface of the liquid-crystal display panel;
stripping the heavy release liner; and
adhering a light-exiting surface of the first optical film to the second side of the adhering layer.

16. The manufacturing method according to claim 13, wherein the optical film comprises a second optical film, and the second optical film is a monolayer film or a composite film; and the step of adhering the adhering layer and the optical film to the shadow surface of the liquid-crystal display panel comprises:

uniformly coating a haze water glue on a light-exiting surface of the second optical film, wherein the haze water glue comprises a glue and diffusing particles dispersed in the glue;

adhering one side of the second optical film that is coated by the haze water glue to the shadow surface of the liquid-crystal display panel; and solidifying the haze water glue, wherein the solidified haze water glue forms the adhering layer.

* * * * *